(12) United States Patent
Lin et al.

(10) Patent No.: US 11,620,499 B2
(45) Date of Patent: Apr. 4, 2023

(54) ENERGY EFFICIENT MACHINE LEARNING MODELS

(71) Applicant: QUALCOMM Incorporated, San Diego, CA (US)

(72) Inventors: Jamie Menjay Lin, San Diego, CA (US); Daniel Hendricus Franciscus Fontijne, Haarlem (NL); Edwin Chongwoo Park, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 662 days.

(21) Appl. No.: 16/694,442

(22) Filed: Nov. 25, 2019

(65) Prior Publication Data

US 2021/0158145 A1    May 27, 2021

(51) Int. Cl.
*G06N 3/08*  (2006.01)
*G06N 3/04*  (2023.01)

(52) U.S. Cl.
CPC ............ *G06N 3/0472* (2013.01); *G06N 3/08* (2013.01)

(58) Field of Classification Search
CPC .............................. G06N 3/0472; G06N 3/08
USPC .......................................................... 706/21
See application file for complete search history.

(56) References Cited

U.S. PATENT DOCUMENTS

2020/0342347 A1* 10/2020 Gambetta ............... G06N 10/00
2020/0380355 A1* 12/2020 Edrenkin ............. G06N 3/0454
2021/0398621 A1* 12/2021 Stojevic ................. G16C 10/00

OTHER PUBLICATIONS

Heaton J., "Ian Goodfellow, Yoshua Bengio, and Aaron Courville: Deep Learning," Genetic Programming and Evolvable Machines, The MIT Press, Springer, Jun. 2018, vol. 19, No. 1-2, pp. 305-307. Retrieved from the URL: https://doi.org/10.1007/s10710-017-9314-z.
Wang X., "SkipNet: Learning Dynamic Routing in Convolutional Networks," Computer Science, Computer Vision and Pattern Recognition, arXiv:1711.09485V2 [cs.CV], Jul. 25, 2018, pp. 1-19.
Wang Y., et al., "EnergyNet: Energy-Efficient Dynamic Inference," 32nd Conference on Neural Information Processing Systems (NIPS), 2018, pp. 1-5.

* cited by examiner

*Primary Examiner* — Gordon G Liu
(74) *Attorney, Agent, or Firm* — Patterson & Sheridan, L.L.P (57) ABSTRACT

Aspects described herein provide a method including: receiving input data at a machine learning model, comprising: a plurality of processing layers; a plurality of gate logics; a plurality of gates; and a fully connected layer; determining based on a plurality of gate parameters associated with the plurality of gate logics, a subset of the plurality of processing layers with which to process the input data; processing the input data with the subset of the plurality of processing layers and the fully connected layer to generate an inference; determining a prediction loss based on the inference and a training label associated with the input data; determining an energy loss based on the subset of the plurality of processing layers used to process the input data; and optimizing the machine learning model based on: the prediction loss; the energy loss; and a prior probability associated with the training label.

20 Claims, 5 Drawing Sheets

ENERGY EFFICIENT MACHINE LEARNING MODELS

INTRODUCTION

Aspects of the present disclosure relate to machine learning models, and in particular to energy and prior probability-aware machine learning models.

Machine learning may produce a trained model (e.g., an artificial neural network, a tree, or other structures), which represents a generalize fit to a set of training data that is known a priori. Applying the trained model to new data produces inferences, which may be used to gain insights into the new data. In some cases, applying the model to the new data is described as "running an inference" on the new data.

Machine learning models are seeing increased adoption across myriad domains, including for use in classification, detection, and recognition tasks. For example, machine learning models are being used to perform complex tasks on electronic devices based on sensor data provided by one or more sensors onboard such devices, such as automatically detecting features (e.g., faces) within images.

Conventional machine learning model development includes collecting training data based on targeted scenarios or use cases followed by training one or more machine learning models (e.g., neural network(s)) based on the targeted scenarios or use cases. The trained model(s) may then be integrated into products used for the targeted scenarios or use cases. However, when the targeted scenarios or use cases change, the model(s) often need re-training in order to maintain optimal performance. Unfortunately, retraining may be impractical for many reasons.

For example, the model(s) may be proprietary to a product manufacturer and only provided as a "black-box" to a customer. In such cases, even if the customer had the technical knowhow to retrain the model, the customer would still have no access to the original model to retrain it. Similarly, while the product manufacturer may have access to the model, it may not have access to the new data generated by the customer and thus may likewise be prevented from retraining the model.

As another example, the products in which the model(s) may be deployed may not have the processing capability necessary for retraining the models locally. For example, power sensitive systems, such as internet of things (IoT) devices and edge devices, may not have the processing or storage resources, or power budget, for retraining onboard models. Notably, these are just a few examples, and many others are emerging as machine learning models become more broadly integrated.

While certain efforts have been made to reduce power consumption of models based on certain model features, e.g., by reducing input data precision to reduce processing load, no technical solutions exists for accounting for changing environmental factors related to the use cases for which such models have been designed. The changed environmental factors may limit the utility of a model designed for a targeted scenario or use case under different environmental assumptions. Consequently, a product incorporating a model may decline in performance over time as environmental factors associated with its use change over time.

Accordingly, what are needed are improved methods for providing robust machine learning models that may be efficiently adapted to environmental changes.

BRIEF SUMMARY

In a first aspect, a method of processing data in a machine learning model, comprises: receiving input data at a machine learning model, the machine learning model comprising: a plurality of processing layers; a plurality of gate logics; a plurality of gates; and a fully connected layer connected to an output of one of the plurality of processing layers; determining based on a plurality of gate parameters associated with the plurality of gate logics, a subset of the plurality of processing layers with which to process the input data; processing the input data with the subset of the plurality of processing layers and the fully connected layer to generate an inference; determining a prediction loss based on the inference and a training label associated with the input data; determining an energy loss based on the subset of the plurality of processing layers used to process the input data; and optimizing the machine learning model based on: the prediction loss; the energy loss; and a prior probability associated with the training label.

In a second aspect, a processing system, comprises: a memory comprising computer-executable instructions; one or more processors configured to execute the computer-executable instructions and cause the processing system to: receive input data at a machine learning model, the machine learning model comprising: a plurality of processing layers; a plurality of gate logics; a plurality of gates; and a fully connected layer connected to an output of one of the plurality of processing layers; determine based on a plurality of gate parameters associated with the plurality of gate logics, a subset of the plurality of processing layers with which to process the input data; process the input data with the subset of the plurality of processing layers and the fully connected layer to generate an inference; determine a prediction loss based on the inference and a training label associated with the input data; determine an energy loss based on the subset of the plurality of processing layers used to process the input data; and optimize the machine learning model based on: the prediction loss; the energy loss; and a prior probability associated with the training label.

In a third aspect, a non-transitory computer-readable medium comprises computer-executable instructions that, when executed by one or more processors of a processing system, cause the processing system to perform a method of processing data in a machine learning model, the method comprising: receiving input data at a machine learning model, the machine learning model comprising: a plurality of processing layers; a plurality of gate logics; a plurality of gates; and a fully connected layer connected to an output of one of the plurality of processing layers; determining based on a plurality of gate parameters associated with the plurality of gate logics, a subset of the plurality of processing layers with which to process the input data; processing the input data with the subset of the plurality of processing layers and the fully connected layer to generate an inference; determining a prediction loss based on the inference and a training label associated with the input data; determining an energy loss based on the subset of the plurality of processing layers used to process the input data; and optimizing the machine learning model based on: the prediction loss; the energy loss; and a prior probability associated with the training label.

Further embodiments relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for improving machine learning model performance based on energy and prior probability awareness. Thus, aspects described herein may be particularly useful for low power systems, such as mobile, IoT, edge, and other devices having processing, power, data connection, and/or memory size limitations. For example, on such devices, it may generally not be possible to store multiple machine learning models. Similarly, it may not be possible on such devices to locally update any machine learning model, such as through retraining.

To overcome the technical shortcoming of existing solutions, aspects described herein allow for training a machine learning model based on a loss function considering both energy and accuracy while considering environmental variables, such as the prior probabilities of model outputs (e.g., predicted classes). Further, the machine learning models described herein may include trainable gating logic that optimizes energy use as well as provides an efficient mechanism for adapting the base machine learning model to different environmental variables. Such features allow for systems employing machine learning models to be initially trained for a wide variety of scenarios or use cases and then further optimized for a specific scenario or use case once deployed to that end.

Brief Background on Neural Networks, Deep Neural Networks, and Deep Learning.

Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated) and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because it can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. Deep learning is thus powerful because it can progressively extract higher level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

Machine Learning Model Optimization

Machine learning models come in many forms, such as neural networks (e.g., deep neural networks and convolutional neural networks), regressions (e.g., logistic or linear), decision trees (including random forests of trees), support vector machines, cascading classifiers and others. While neural networks are discussed throughout as one example application for the methods described herein, these same methods may be likewise applied to other types of machine learning models.

In machine learning, the training of a model may be considered as an optimization process by taking a set of observations and performing maximum likelihood estimations such that a target probability is maximized. In statistics, maximum likelihood estimation is a method of estimating the parameters of a probability distribution by maximizing a likelihood function, so that under the assumed statistical model the observed data is most probable. This, in the context of a machine learning model, the following expressions may be derived:

$$\hat{\theta}_{ML} = g(x^1, \ldots, x^M) = \underset{\theta}{\mathrm{argmax}}\, p_{model}(X;\theta) = \underset{\theta}{\mathrm{argmax}} \prod_{i=1}^{M} p_{model}(x^i;\theta) =$$

$$\underset{\theta}{\mathrm{argmax}} \sum_{i=1}^{M} \log p_{model}(x^i;\theta) = \underset{\theta}{\mathrm{argmax}}\, E_{x \sim \hat{p}_{data}} \log p_{model}(x;\theta)$$

In the preceding expressions, $\hat{\theta}_{ML}$ is the maximum-likelihood estimator, $x^1, \ldots, x^M$ are M observations, g is certain function taking observations, $p_{model}$ is the probability distribution over the same space indexed by θ, and $E_{x \sim \hat{p}_{data}}$ is the expectation of an empirical distribution of $\hat{p}_{data}$.

In another view, the maximum likelihood estimation is based on minimizing the dissimilarity between the empirical distribution defined by the training set and the model distribution, which may be seen as the Kullback-Leibler divergence. In practice, supervised learning may be used to train the system against known labels and to infer outcomes through conditional probability of independent and identically distributed random variables $x^1, \ldots, x^M$ as below:

$$\hat{\theta}_{ML} = \underset{\theta}{\mathrm{argmax}} P(Y \mid X; \theta) = \underset{\theta}{\mathrm{argmax}} \sum_{i=1}^{M} \log P(y^i \mid x^i; \theta).$$

Such maximum likelihood estimation for training of machine learning models, such as neural networks, is reasonable in a maximum likelihood context. For example, in a system for face recognition that is intended to recognize the owner of a device, a set of observations (i.e., a set of images, each showing the face of a human) may be collected as training data to train a neural network model that works well for the specific face recognition use case.

However, there are many contexts in which training is not so straightforward—especially when power sensitivity is considered. Consider, for example, a machine learning model configured to detect human presence using a low-power embedded (or IoT) image sensor. Here, the task of the model is not to detect the same human that always appears in images, but rather to detect whether a human is present. In such a scenario, environmental factors may contribute significantly to model performance, such as a "prior probability" (e.g., as in a Bayesian statistical inference) of a human being present.

For example, if the human presence detector is located outdoors in an area with wildlife and day and night conditions, the prior probability of a human being present in any potential detection might be lower compared to an alternative scenario in which the human presence detector is located inside a continually-lit portion of a building without wildlife or variable lighting conditions, in which the prior probability of a human in any potential detection may be higher. Notably, this is just one simple example of different environments that may affect prior probabilities, and there are many more. For example, beyond macro-level environmental classes, such as outdoor and indoor, there innumerable micro-level environmental sub-classes, such as suburban, urban, rural, beach-facing, traffic-facing, and the like for outdoor environments. Similarly, for indoor, there may be sub-classes such as commercial, residential, different types of room, window-facing, door-facing, etc. Notably, these are just a few example, which help to highlight the challenge addressed by the systems and methods described herein.

Thus, these environmental probabilities affect the performance of the underlying model, but they are extremely difficult to account for by a manufacturer that does not know in which environment the human presence detector is going to be deployed. This problem is compounded by the fact that the model within a deployed system generally cannot be easily retrained in the field owing to various factors, such as limited processing power, limited power budget, limited access to new training data, etc.

More generally, while manufacturers of systems incorporating machine learning models will want the systems to work optimally in many environmental scenarios, this desire is difficult to achieve without a priori knowledge of applicable prior probabilities (or "priors") associated with environmental factors for a specific targeted scenario or use case for the system.

The systems and methods described herein help resolve this problem and improve performance of machine learning models in terms of accuracy and power consumption by adjusting the model based on prior probabilities environmental factors associated with the environmental factors for a specific targeted scenario or use case. More specifically, the systems and methods described herein reflect the prior probabilities through training, optimization, and retraining based on environment and energy efficiency factors.

Machine Learning Model Architecture with Gating Function for Energy Saving

Figure 1:
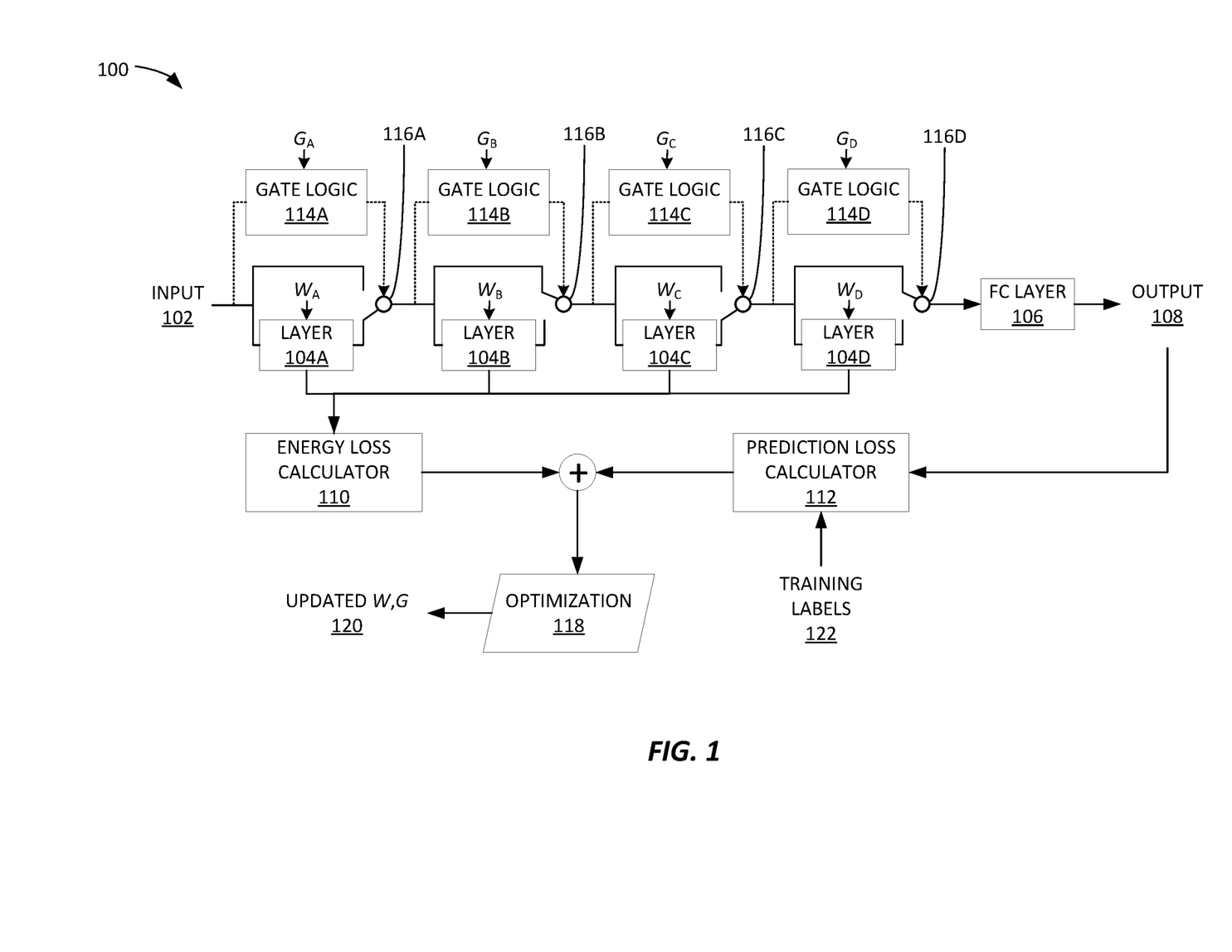
FIG. 1 depicts an example machine learning model architecture.

FIG. 1 depicts an example machine learning model architecture 100.

In this example, a machine learning model includes layers 104A-D and 106. Layers 104A-D may be various sorts of operational layers, such as convolutional layers, in a neural network model. Each of layers 106A-D include layer weights $W_A$-$W_D$, respectively.

The machine learning model further includes layer 106, which in this example is a fully connected layer configured to translate the output of layer 104D into a usable useable output, such as an output classification.

Model architecture 100 further includes gate logics 114A-D, each corresponding to one of the layers 104A-D. Like layers 104A-D, each of gate logics 114A-D includes parameters $G_A$-$G_D$, respectively.

Here, each of gate logics 114A-D processes the input data for it associated layer and determines, based on the input data and its parameters, whether the associated layer should be skipped during processing. For example, gate logic 114B determines based on the input data to layer 104B (output from layer 104A) and its parameters GB that layer 104B should be skipped and controls an associated gate 116B to cause the input to layer 104G to flow around layer 104B and act as input to the next layer, 104C. By doing so, the processing associated with layer 104B is avoided and energy is saved.

As depicted in the example of FIG. 1, layers 104A and 104C are processed while layers 104B and 104D are skipped, thus saving significant energy in the overall model processing.

Notably, while FIG. 1 depicts an example in which the gate logic results in processing or skipping a specific layer, other examples may have other gating logic, such as terminating processing altogether, skipping more than one layer, etc. FIG. 1 depicts just one example of gate logic for simplicity.

An energy loss calculator 110 determines an energy loss associated with each of layers 104A-D based on whether the layer is processed, such as 104A and 104C in this example, or not processed, such as 104B and 104D in this example.

The output 108 of the model may be compared to known training labels 122 in order to determine the prediction loss (error).

In this example, the prediction loss and energy loss are added together to form a total loss, which is used for an optimization scheme for the model, such as a backpropagation of a neural network model.

Energy and Prior Probability Sensitive Loss Functions for Model Optimization

As depicted in FIG. 1, a training scheme for machine learning models may incorporate multiple loss components, including an energy loss component in addition to the conventional prediction loss (error). This allows energy to be accounted for during training where a machine learning model may be able to control its energy use, such as by gating in FIG. 1.

For example, an energy-aware loss function may be defined as:

$$\text{Loss} = \min_{W,G} L(W, G) + \alpha E(W, G) \quad \text{(Equation 1)}$$

In Equation 1, $L(\ )$ is a legacy machine learning-based loss function, $E(\ )$ is an energy cost, W stands for a base model's weights or parameters (e.g., of a convolutional neural network model), and G stands for a gating network's weights or parameters, where the gating network controls conditions for execution of various portions of the base model, such as depicted in FIG. 1. Conventionally, with such a loss function, a maximum likelihood assumption is used for model optimization.

By contrast, methods described herein introduce prior probabilities (i.e., according to a Bayesian decision rule) and costs into a loss function. For example, the following enhanced loss function may be used to obtain an optimization that better accounts for environmental factors related to targeted scenarios or use cases of a machine learning model:

$$\text{Loss} = \min_{W,G,X,P} \sum_X (L_{X_i}(W, G) + \alpha_{X_i} E_{X_i}(W, G)) P(X_i) \quad \text{(Equation 2)}$$

In Equation 2, $x \sim X_i$, $X_i \in X$, and x is an example with $i \in \{0, 1, \ldots, C-1\}$ for indices for a class out of a total size C. Each x conforms (~) to a unique class $X_i$. Further, P is the prior probability over X and $P(X_i)$ is the prior probability of $X_i$ occurring. In this example, $L_{X_i}$ and $E_{X_i}$ are assumed to be derived based on a maximum likelihood assumption regarding X. Note that in a case where a maximum likelihood condition no longer holds or where the prior probability conditions change, $L_{X_i}$ and $E_{X_i}$ may need to be updated to reflect current conditional probabilities for those $X_i$ classes of X. Finally, $\alpha_{X_i}$ is a scalar allowing for adjusting of the relative impact of the energy loss to the overall loss. Notably, in Equation 2, $(1-\alpha_{X_i})$ may be omitted from the $L_{X_i}(\ )$ term to avoid an additional multiplication (thus saving power) because only the minimum of the loss, not the absolute quantity of total loss, is important for the optimization. Equation 2 may referred to as a prior probability-aware loss function.

In this example, each of the training examples belongs to a unique class $x_i$. For example, returning to the human presence detector example, in an outdoor environment, $\{X_i, X_j, X_k\}$ may represent scene detection classes {background, human, animal}.

In a power-sensitive system, such as an IoT or embedded sensor system, retraining an entire model in the deployed system may not be desirable or possible in the field. As an alternative, the loss function for training may be adapted as:

$$\text{Loss} = \min_{G,X,P} \sum_X (L_{X_i}(G) + \beta_{X_i}(G)) P(X_i) \quad \text{(Equation 3)}$$

Equation 3 is another prior probability-aware loss function. In Equation 3, $\beta_{X_i}$ is a scalar allowing for adjusting of the relative impact of the Energy loss to the overall loss. In Equation 3, unlike Equation 2, the parameters of W (e.g., base model weights) are fixed such that W is not considered in the loss function, and thus the weights and biases of W need not be trained (or retrained). This leaves only the G portion of the machine learning model to be trained (or retrained) while plugging in the prior probabilities from P. As above in Equation 2, here $(1-\beta_{X_i})$ may be omitted from the $L_{X_i}(\ )$ term to avoid an additional multiplication and save power.

For example, only the gate logics 114A-D in FIG. 1 would need retraining while layer 104A-D would stay fixed. Because the gate logic portions of the machine learning model are relatively small compared to the model layers, training with a loss function that only considers the gate logic parameters is significantly faster and more energy efficient, which may beneficially enable retraining of models in deployed systems.

Thus, training (or retraining) according to the prior probability-aware loss function in Equation 3 improves power performance and outperforms models trained using conventional maximum likelihood assumptions. Further, training according to Equation 3 improves the accuracy of the trained model due to the reflection of prior probabilities during training as compared to the maximum likelihood case.

Returning to the example of a human presence detector, a model such as depicted in FIG. 1 could initially be trained for detecting human presence in a general case. Thereafter, the gate logics of the model could be updated (e.g., through retraining) using specific prior probabilities related to a specific targeted scenario or use case, such as an outdoor human presence detector. This allows a single system design and initial model to be adapted to many different specific use cases with greatly reduced training burden on end users, such as customers.

In some cases, a deployed system might collect operational data and provide that data for retraining of its onboard model(s). For example, the deployed system may run certain outer-loop logic through simple filtering to derive prior probabilities, such as using a simple 1-pole infinite impulse response (IIR) filter to derive the prior probabilities accurately and with negligible additional power consumption and memory use. The retraining may be performed locally or remotely in different embodiments.

In some cases, the machine learning model may have fixed energy costs even if prior probabilities change. For example, the energy consumption and data movement cost for detecting a human when a human is or is not actually present may not change even if the prior probabilities do change.

In other embodiments, a system with a machine learning model may include a plurality of pre-defined model layer weights and/or gating logic parameters, which are based on the prior probabilities. For example, a look-up table may associate prior probabilities with the appropriate weights, which may have been determined by earlier training by the system manufacturer. In this way, a system may be configured for optimal performance by an end-user without any additional training (or retraining) in the field.

In some cases, especially in power sensitive applications, the loss function may also consider system-specific factors, such as such as battery status and user alerts or interactions. Such events may also be filtered or modified based on recentness to reflect emphasis on significance. So, for example, recent events may get larger weights.

Derivation of Prior Probabilities

Several methods are possible for deriving the prior probabilities of classes (e.g., $X_i \in X$), which may be used in Equation 3, above.

For example, a user may manually determine and configure prior probabilities for the system, such as based on manual testing, or based on feedback from ancillary systems.

Alternatively, automatic filtering-based configuration of the prior probability may be performed. For example, the system may profile the probabilities through its continuing neural network classification processes. Filtering to derive the prior probabilities may be a practical approaches for deployed systems.

Example steps for filtering include, for each sample x, if the model classifies it as class $X_i$, i.e., $x \sim X_i$, then set $z_i=1$. Otherwise, set $z_i=0$. Then update the prior for class $X_i$ through filtering: $z=(1-\alpha)z+\alpha z_i$, where $\alpha \in [0,1]$. These steps may be iterated for each class $X_i$, $X_i \in X$, and repeated for each new sample x.

Another alternative for deriving the prior probabilities is automatic configuration via, for example, a look-up table. For example, a pre-defined look-up table or hash table may be used where the keys are certain metrics (including possible filtered coarse priors), and the values are the refined priors.

It is possible that certain hybrid approaches may be used, such as using both filtering and a look-up table for deriving prior probabilities and configuring a model. Further, the look up table method be used to speed converging of filtering for updating prior probabilities.

Example Loss Functions Based on Different Probability Metrics

Figure 2:
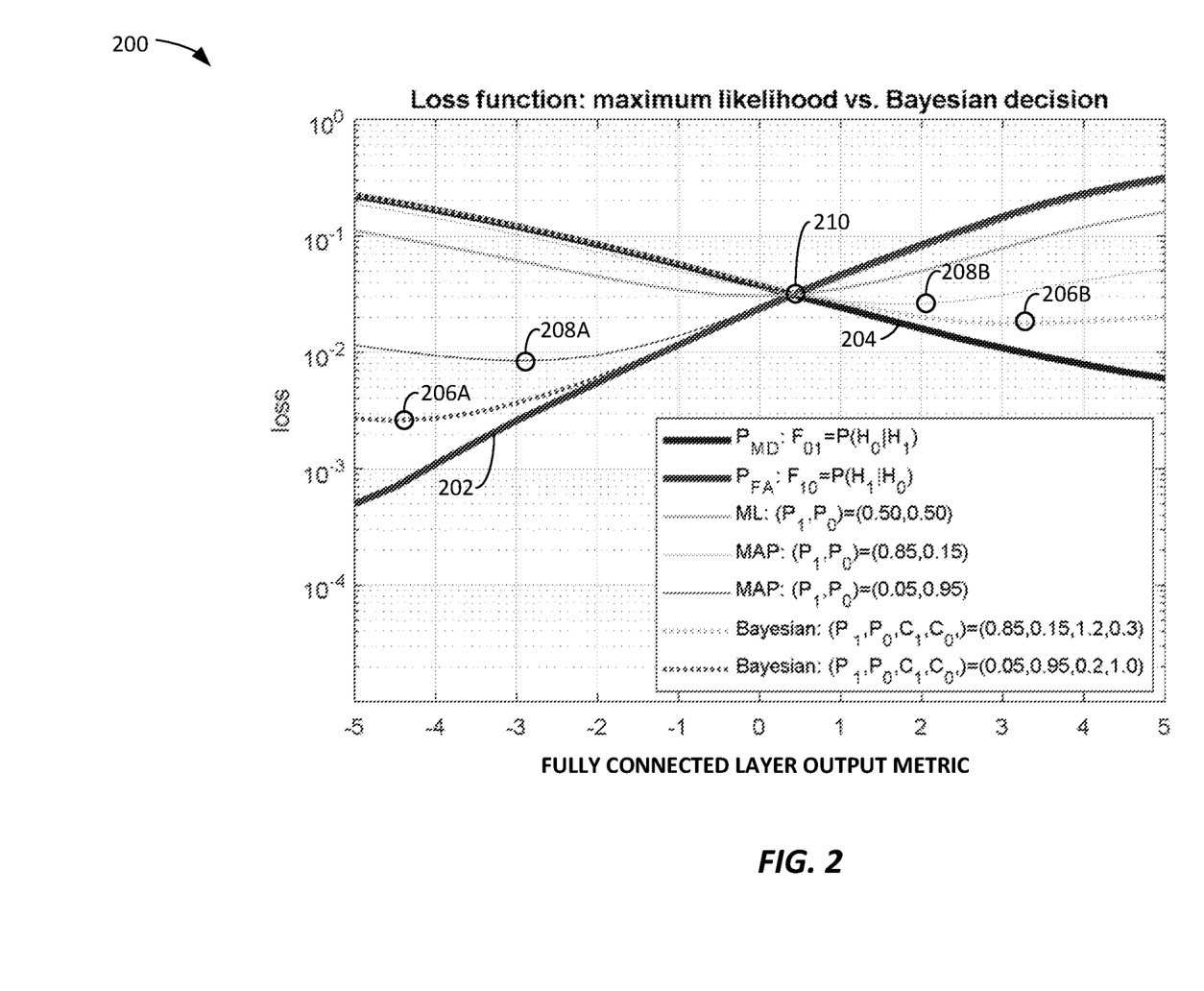
FIG. 2 compares various loss functions, including maximum likelihood, maximum a posteriori, and Bayesian.

FIG. 2 compares various loss functions, including maximum likelihood, maximum a posteriori, and Bayesian. In FIG. 2, $H_0$ denotes the case in which a human is not present and $H_1$ denotes the case in which a human is present.

For maximum likelihood, Loss=$P_{err}=F_{01}+F_{10}$, where $F_{01}$ is a false negative (i.e., a human is present, but not detected in the human presence detector example) and $F_{10}$ is a false positive (i.e., a human is detected, but not present in the human presence detector example).

For maximum a posteriori, Loss=$P_{err}=F_{01}*P_1+F_{10}*P_0$, where $P_1$ is the prior probability of a human being present and $P_0$ is the prior probability of a human not being present.

For Bayesian, Loss=$F_{01}*P_1*C_{01}+F_{10}*P_0*C_{10}$, where $C_{01}$ is a cost value or function for false negatives and $C_{10}$ is a cost value or function for false positives.

In FIG. 2, line 202 represents the loss associated with a false positive (i.e., a human is detected, but not present in the human presence detector example) given a metric based on the output of a fully connected layer of a neural network, such as layer 106 in FIG. 1. Line 204 represents the loss of a false negative (i.e., a human is not detected, but is present in the human presence detector example) given a metric based on the output of the fully connected layer of the neural network.

As depicted, the maximum likelihood loss functions has a minimum loss value at points 210. The maximum a posteriori loss function has minimum loss values based on two different prior probability sets (($P_1$, $P_0$)=(0.85, 0.15) and ($P_1$, $P_0$)=(0.05, 0.95)) at points 208A and 208B. However, the best performance (in terms of loss) is achievable with the Bayesian loss function at points 206A and 206B, which is also shown with respect to the same two prior probability sets (($P_1$, $P_0$)=(0.85, 0.15) and ($P_1$, $P_0$)=(0.05, 0.95)).

Thus, in FIG. 2, the optimums, each with its minimum loss, vary as the prior probabilities and cost metrics change. Proper configuration (including parameters of prior probabilities) and re-training produce weights and biases that help the system operate optimally.

Figure 3:
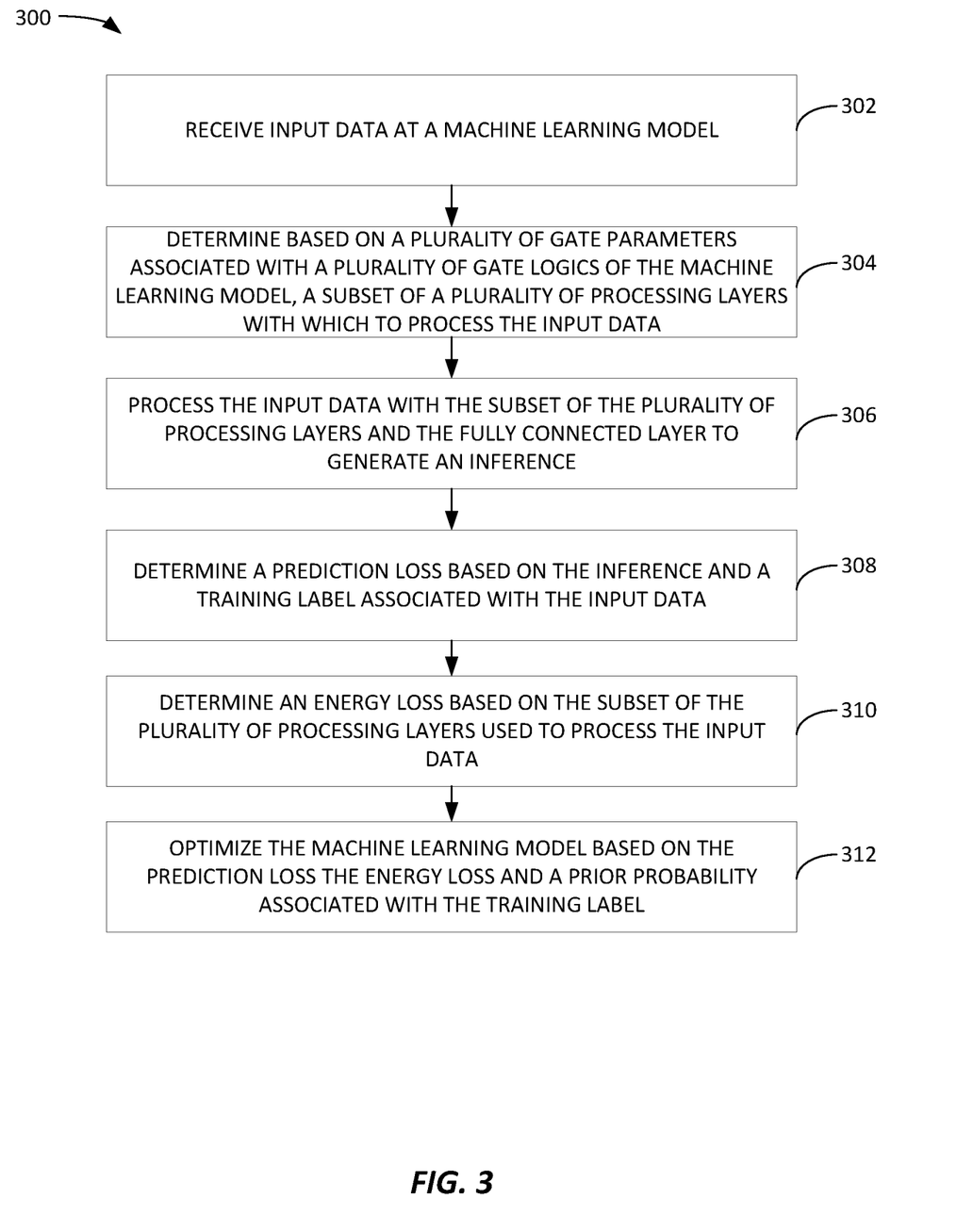
FIG. 3 depicts an example method of processing data in a machine learning model.

Example Method of Processing Data with Energy and Prior Probability-Aware Machine Learning Models FIG. 3 depicts an example method 300 of processing data in a machine learning model.

Method 300 begins at step 302 with receiving input data at a machine learning model, the machine learning model comprising. In some embodiments, as in FIG. 1, the machine learning model comprises a plurality of processing layers, a plurality of gate logics, a plurality of gates, and a fully connected layer connected to an output of one of the plurality of processing layers.

Method 300 then proceeds to step 304 with determining based on a plurality of gate parameters associated with the plurality of gate logics, a subset of the plurality of processing layers with which to process the input data.

Method 300 then proceeds to step 306 with processing the input data with the subset of the plurality of processing layers and the fully connected layer to generate an inference.

Method 300 then proceeds to step 308 with determining a prediction loss based on the inference and a training label associated with the input data.

Method 300 then proceeds to step 310 with determining an energy loss based on the subset of the plurality of processing layers used to process the input data.

Method 300 then proceeds to step 304 with optimizing the machine learning model. In some embodiments, the optimizing is based on: the prediction loss, the energy loss, and a prior probability associated with the training label.

In some embodiments of method 300, optimizing the machine learning model comprises: determining updated layer weights for one or more of the processing layers; and determining updated gate logic parameters for one or more of the gate logics. In such embodiments, optimizing the machine learning model may be performed using a loss function of:

$$\text{Loss} = \min_{W,G,X,P} \sum_X (L_{X_i}(W, G) + \alpha_{X_i} E_{X_i}(W, G)) P(X_i),$$

wherein $x_i$ comprises the input data in a class $X_i$, $P(X_i)$ comprises the prior probability associated with the class $X_i$, W comprises the updated layer weights, G comprises the updated gate logic parameters, and $\alpha_{X_i}$ comprises a predetermined scalar value.

In some embodiments of method 300, optimizing the machine learning model comprises determining updated gate logic parameters for one or more of the gate logics. In such embodiments, optimizing the machine learning model may be performed using a loss function of:

$$\text{Loss} = \min_{G,X,P} \sum_X (L_{X_i}(G) + \beta_{X_i}(G))P(X_i),$$

$x_i$ comprises the input data in a class $X_i$, $P(X_i)$ comprises the prior probability associated with the class $X_i$, G comprises the updated logic parameters, and $\beta_{X_i}$ comprises a predetermined scalar value.

Some embodiments of method 300 further include determining an updated prior probability based on the inference. In some embodiments of method 300, determining the updated layer weights and determining the updated gate logic parameters are based on the updated prior probability.

Example Processing System

Figure 4:
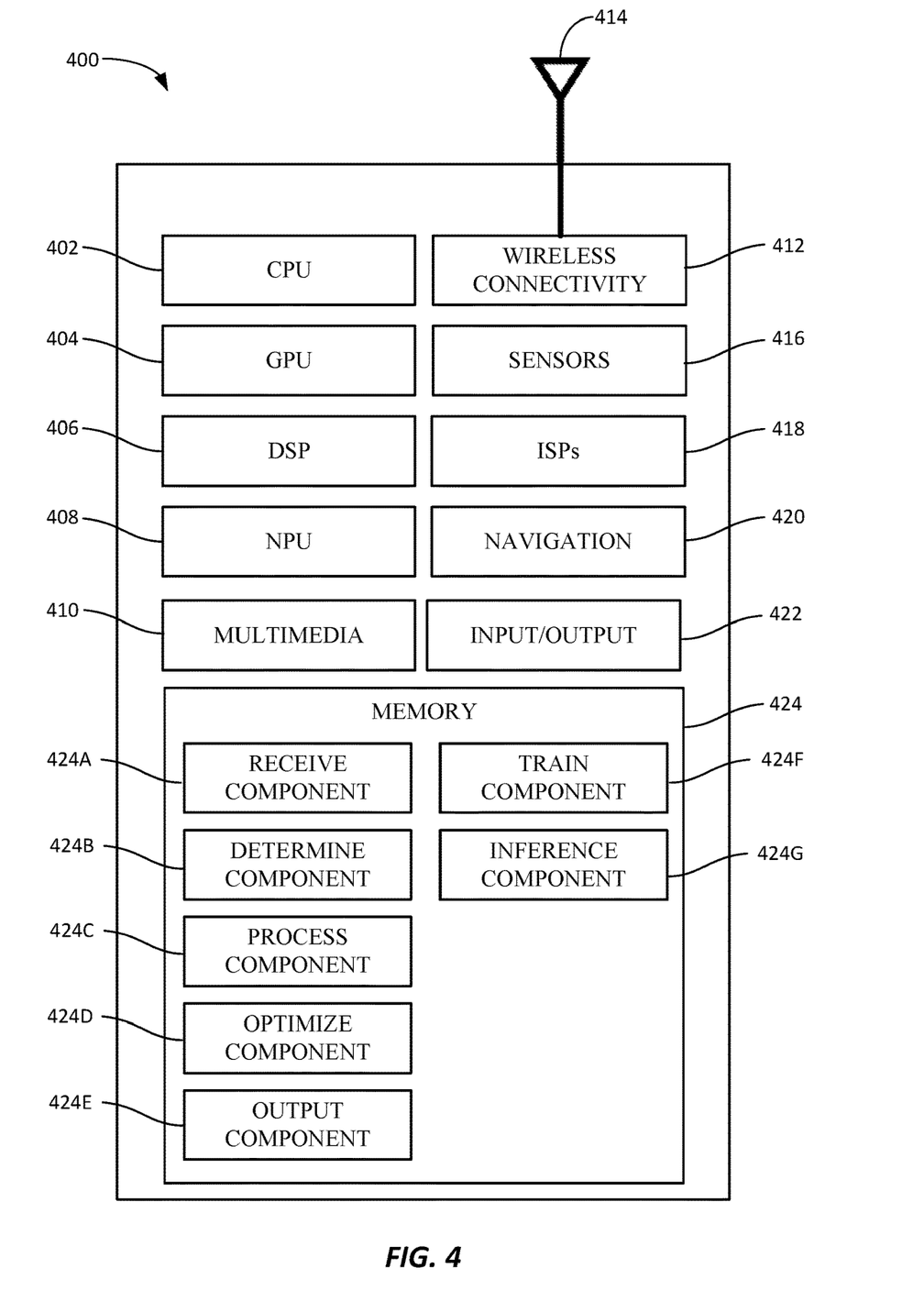
FIG. 4 illustrates an example electronic device, which may be configured to perform the methods described herein.

FIG. 4 illustrates an example electronic device 400. Electronic device 400 may be configured to perform the methods described herein, including with respect to FIG. 3.

Electronic device 400 includes a central processing unit (CPU) 402, which in some embodiments may be a multi-core CPU. Instructions executed at the CPU 402 may be loaded, for example, from a program memory associated with the CPU 402 or may be loaded from a memory block 424.

Electronic device 400 also includes additional processing blocks tailored to specific functions, such as a graphics processing unit (GPU) 404, a digital signal processor (DSP) 406, a neural processing unit (NPU) 408, a multimedia processing block 410, a multimedia processing unit 410, and a wireless connectivity block 412.

In one implementation, NPU 408 is a part of one or more of CPU 402, GPU 404, and/or DSP 406.

In some embodiments, wireless connectivity block 412 may include components, for example, for third generation (3G) connectivity, fourth generation (4G) connectivity (e.g., 4G LTE), fifth generation connectivity (e.g., 5G or NR), Wi-Fi connectivity, Bluetooth connectivity, and wireless data transmission standards. Wireless connectivity processing block 412 is further connected to one or more antennas 414.

Electronic device 400 may also include one or more sensor processors 416 associated with any manner of sensor, one or more image signal processors (ISPs) 418 associated with any manner of image sensor, and/or a navigation processor 420, which may include satellite-based positioning system components (e.g., GPS or GLONASS) as well as inertial positioning system components.

Electronic device 400 may also include one or more input and/or output devices 422, such as screens, touch-sensitive surfaces (including touch-sensitive displays), physical buttons, speakers, microphones, and the like.

In some embodiments, one or more of the processors of electronic device 400 may be based on an ARM or RISC-V instruction set.

Electronic device 400 also includes memory 424, which is representative of one or more static and/or dynamic memories, such as a dynamic random access memory, a flash-based static memory, and the like. In this example, memory 424 includes computer-executable components, which may be executed by one or more of the aforementioned processors of electronic device 400. In particular, in this embodiment, memory 424 includes receive component 424A, transform component 424B, provide component 424C, process component 424D, output component 424E, determine component 424F, exponent component 424G, quantize component 424H, train component 424I, inference 424J. The depicted components, and others not depicted, may be configured to perform various aspects of the methods described herein.

Generally, electronic device 400 and/or components thereof may be configured to perform the methods described herein.

Figure 5:
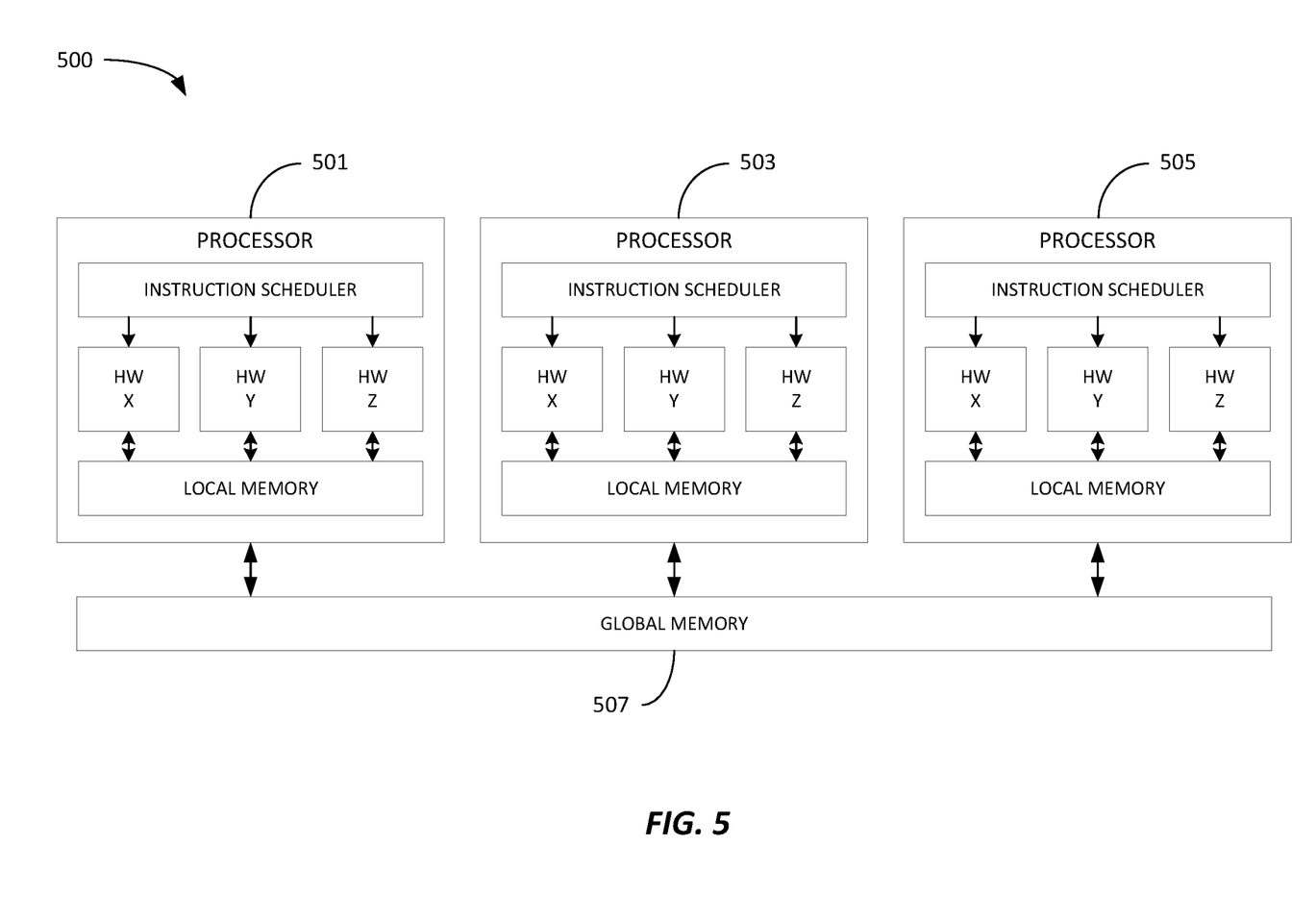
FIG. 5 depicts an example multi-processor processing system, which may be configured to perform the methods described herein.

FIG. 5 depicts an example multi-processor processing system 500 that may be implemented with embodiments described herein. For example, multi-processing system 500 may be representative of various processors of electronic device 400 of FIG. 4.

In this example, system 500 includes processors 501, 503, and 505, but in other examples, any number of individual processors may be used. Further, though depicted similarly, processors 501, 503, and 505 may be representative of various different kinds of processors in an electronic device, such as CPUs, GPUs, DSPs, NPUs, and the like as described herein.

Each of processors 501, 503, and 505 includes an instruction scheduler, various hardware sub-components (e.g., hardware X, hardware Y, and hardware Z), and a local memory. In some embodiments, the local memory may be a tightly coupled memory (TCM). Note that while the components of each of processors 501, 503, and 505 are shown as the same in this example, in other examples, some or each of the processors 501, 503, and 505 may have different hardware configurations, different hardware elements, etc.

Each of processors 501, 503, and 505 is also in data communication with a global memory, such as a DDR memory, or other types of volatile working memory. For example, global memory 507 may be representative of memory 424 of FIG. 6.

In some implementations, in a multi-processor processing system such as 500, one of the processors may act as a master processor. For example, processor 501 may be a master processor in this example. A master processor may include a compiler that, when executed, can determine how a model, such as a neural network, will be processed by various components of processing system 500. For example, hardware parallelism may be implemented by mapping portions of the processing of a model to various hardware (e.g., hardware X, hardware Y, and hardware Z) within a given processor (e.g., processor 501) as well as mapping portions of the processing of the model to other processors (e.g., processors 503 and 505) and their associated hardware. For example, the parallel blocks in the parallel block processing architectures described herein may be mapped to different portions of the various hardware in processors 501, 503, and 505.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of processing data in a machine learning model, comprising:
   receiving input data at a machine learning model, the machine learning model comprising:
      a plurality of processing layers;
      a plurality of gate logics;
      a plurality of gates; and
      a fully connected layer connected to an output of one of the plurality of processing layers;
   determining based on a plurality of gate parameters associated with the plurality of gate logics, a subset of the plurality of processing layers with which to process the input data;
   processing the input data with the subset of the plurality of processing layers and the fully connected layer to generate an inference;
   determining a prediction loss based on the inference and a training label associated with the input data;
   determining an energy loss based on the subset of the plurality of processing layers used to process the input data; and
   optimizing the machine learning model based on:
      the prediction loss;
      the energy loss; and
      a prior probability associated with the training label.

2. The method of claim 1, wherein optimizing the machine learning model is based on a loss function comprising a prior probability element.

3. The method of claim 2, wherein optimizing the machine learning model comprises:
   determining updated layer weights for one or more of the processing layers; and
   determining updated gate logic parameters for one or more of the gate logics.

4. The method of claim 3, wherein:
   the loss function is:

$$\text{Loss} = \min_{W,G,X,P} \sum_{X} (L_{X_i}(W, G) + \alpha_{X_i} E_{X_i}(W, G)) P(X_i),$$

min comprises a minimum function,
i comprises an index value,
$x_i$ comprises the input data in a class $X_i$,
$P(X_i)$ comprises the prior probability associated with the class $X_i$,
$L_{x_i}$ comprises a loss function associated with $x_i$,
$E_{x_i}$ comprises an energy cost function associated with $x_i$,
W comprises the updated layer weights, G comprises the updated gate logic parameters, and
$a_{x_i}$ comprises a predetermined scalar value.

5. The method of claim 3, further comprising: determining an updated prior probability associated with the training label based on the inference.

6. The method of claim 5, wherein determining the updated layer weights and determining the updated gate logic parameters are based on the updated prior probability.

7. The method of claim 2, wherein optimizing the machine learning model comprises determining updated gate logic parameters for one or more of the gate logics.

8. The method of claim 7, wherein:
the loss function is:

$$\text{Loss} = \min_{G,X,P} \sum_X (L_{X_i}(G) + \beta_{X_i}(G))P(X_i),$$

min comprises a minimum function,
i comprises an index value,
$x_i$ comprises the input data in a class $X_i$,
$L_{x_i}$ comprises a loss function associated with $x_i$,
$P(X_i)$ comprises the prior probability associated with the class $X_i$,
G comprises the updated gate logic parameters, and
$\beta_{x_i}$ comprises a predetermined scalar value.

9. A processing system, comprising:
a memory comprising computer-executable instructions;
one or more processors configured to execute the computer-executable instructions and cause the processing system to:
  receive input data at a machine learning model, the machine learning model comprising:
    a plurality of processing layers;
    a plurality of gate logics;
    a plurality of gates; and
    a fully connected layer connected to an output of one of the plurality of processing layers;
  determine based on a plurality of gate parameters associated with the plurality of gate logics, a subset of the plurality of processing layers with which to process the input data;
  process the input data with the subset of the plurality of processing layers and the fully connected layer to generate an inference;
  determine a prediction loss based on the inference and a training label associated with the input data;
  determine an energy loss based on the subset of the plurality of processing layers used to process the input data; and
  optimize the machine learning model based on:
    the prediction loss;
    the energy loss; and
    a prior probability associated with the training label.

10. The processing system of claim 9, wherein the one or more processors are further configured to optimize the machine learning model based on a loss function comprising a prior probability element.

11. The processing system of claim 10, wherein in order to optimize the machine learning model, the one or more processors are further configured to:
determine updated layer weights for one or more of the processing layers; and
determine updated gate logic parameters for one or more of the gate logics.

12. The processing system of claim 11, wherein:
the loss function is:

$$\text{Loss} = \min_{W,G,X,P} \sum_X (L_{X_i}(W, G) + \alpha_{X_i} E_{X_i}(W, G))P(X_i),$$

min comprises a minimum function,
i comprises an index value,
$x_i$ comprises the input data in a class $X_i$,
$P(X_i)$ comprises the prior probability associated with the class $X_i$,
$L_{x_i}$ comprises a loss function associated with $x_i$,
$E_{x_i}$ comprises an energy cost function associated with $x_i$,
W comprises the updated layer weights,
G comprises the updated gate logic parameters, and
$\alpha_{x_i}$ comprises a predetermined scalar value.

13. The processing system of claim 11, wherein the one or more processors are further configured to determine an updated prior probability associated with the training label based on the inference.

14. The processing system of claim 13, wherein the one or more processors are further configured to determine the updated layer weights and determine the updated gate logic parameters based on the updated prior probability.

15. The processing system of claim 10, wherein in order to optimize the machine learning model, the one or more processors are further configured to determine updated gate logic parameters for one or more of the gate logics.

16. The processing system of claim 15, wherein:
the loss function is:

$$\text{Loss} = \min_{G,X,P} \sum_X (L_{X_i}(G) + \beta_{X_i}(G))P(X_i),$$

min comprises a minimum function,
i comprises an index value,
$x_i$ comprises the input data in a class $X_i$,
$L_{x_i}$ comprises a loss function associated with $x_i$,
$P(X_i)$ comprises the prior probability associated with the class $X_i$,
G comprises the updated gate logic parameters, and
$\beta_{x_i}$ comprises a predetermined scalar value.

17. A non-transitory computer-readable medium comprising computer-executable instructions that, when executed by one or more processors of a processing system, cause the processing system to perform a method of processing data in a machine learning model, the method comprising:
receiving input data at a machine learning model, the machine learning model comprising:
  a plurality of processing layers;
  a plurality of gate logics;
  a plurality of gates; and
  a fully connected layer connected to an output of one of the plurality of processing layers;
determining based on a plurality of gate parameters associated with the plurality of gate logics, a subset of the plurality of processing layers with which to process the input data;
processing the input data with the subset of the plurality of processing layers and the fully connected layer to generate an inference;
determining a prediction loss based on the inference and a training label associated with the input data;
determining an energy loss based on the subset of the plurality of processing layers used to process the input data; and
optimizing the machine learning model based on:
  the prediction loss;
  the energy loss; and
  a prior probability associated with the training label.

18. The non-transitory computer-readable medium of claim 17, wherein optimizing the machine learning model is based on a loss function comprising a prior probability element.

19. The non-transitory computer-readable medium of claim 18, wherein optimizing the machine learning model comprises:
- determining updated layer weights for one or more of the processing layers; and
- determining updated gate logic parameters for one or more of the gate logics.

20. The non-transitory computer-readable medium of claim 19, wherein the method further comprises:
- determining an updated prior probability associated with the training label based on the inference, and
- wherein determining the updated layer weights and determining the updated gate logic parameters are based on the updated prior probability.

* * * * *